United States Patent

Skipper

[11] Patent Number: 4,552,035
[45] Date of Patent: Nov. 12, 1985

[54] REINFORCED CONNECTING LINK MEANS

[75] Inventor: John B. Skipper, Lutterworth, England

[73] Assignee: Dunlop Limited, London, England

[21] Appl. No.: 507,730

[22] Filed: Jun. 24, 1983

[30] Foreign Application Priority Data

Jul. 1, 1982 [GB] United Kingdom ............... 8218980

[51] Int. Cl.[4] ................................ G05G 1/00
[52] U.S. Cl. ........................................ 74/581
[58] Field of Search ................... 74/579 R, 581; 416/134 A

[56] References Cited

U.S. PATENT DOCUMENTS

| | | | |
|---|---|---|---|
| 3,279,278 | 10/1966 | Eldred | 74/579 |
| 3,362,252 | 1/1968 | Ditlinger | 74/579 |
| 3,411,379 | 11/1968 | Deyerling | 74/579 R |
| 3,436,038 | 4/1969 | Parsons et al. | 244/123 |
| 4,183,261 | 1/1980 | Eiselbrecher | 74/579 R |
| 4,255,087 | 3/1981 | Wackerle | 416/134 A X |
| 4,300,410 | 11/1981 | Raghupathi | 74/579 R |
| 4,353,267 | 10/1982 | Robert | 74/579 R |

FOREIGN PATENT DOCUMENTS

| | | |
|---|---|---|
| 0019494 | 11/1980 | European Pat. Off. .......... 74/579 R |
| 722719 | 7/1942 | Fed. Rep. of Germany . |
| 1007202 | of 1957 | Fed. Rep. of Germany . |
| 1125794 | of 1962 | Fed. Rep. of Germany . |
| 1531359 | of 1970 | Fed. Rep. of Germany . |
| 2058028 | of 1971 | Fed. Rep. of Germany . |
| 2332435 | of 1974 | Fed. Rep. of Germany . |
| 1042383 | 10/1953 | France . |
| 1377008 | 9/1964 | France . |
| 2452630 | 10/1980 | France . |
| 1196318 | 6/1970 | United Kingdom . |
| 1264088 | 2/1972 | United Kingdom . |
| 1378263 | 12/1974 | United Kingdom . |
| 2082716 | 3/1982 | United Kingdom . |
| 2088793 | 6/1982 | United Kingdom . |

OTHER PUBLICATIONS

C. H. Fagan, Elastomeric Bearing Application to Helicopter Tail Rotor Designs, Jan. 25, 1968.

*Primary Examiner*—Gary L. Smith
*Assistant Examiner*—Adrian H. Whitcomb, Jr.
*Attorney, Agent, or Firm*—Stevens, Davis, Miller & Mosher

[57] ABSTRACT

Link means for connecting two components comprises a pair of axially spaced bushes each adapted for connection to a respective one of said components and an endless band extending between the bushes. Band has side portions disposed on opposite sides of the longitudinal axis of the link means and end portions each disposed around a respective bush. Each end portion is positively secured to the associated bush by wrapping reinforcement material around the end portion and associated bush, preferably in a figure of eight pattern, such that band is capable of transmitting both tension and compression loads between the bushes.

30 Claims, 3 Drawing Figures

REINFORCED CONNECTING LINK MEANS

This invention concerns improvements in or relating to link means for connecting two components which is capable of accommodating both tension and compression loads.

Link means is known comprising a pair of axially spaced bushes adapted for connection to a respective one of two components in which tension loads are transmitted between the bushes by a hoop type reinforcement structure formed by a reinforcement material wrapped around the bushes and compression loads are transmitted between the bushes by a strut type reinforcement structure acting independently of the hoop type reinforcement structure and formed by a reinforcement material inserted between the bushes. The use of independent reinforcement structures for the transmission of tension and compression loads is undesirable from weight, cost and assembly considerations.

The invention as claimed is intended to remedy these drawbacks. It solves the problem by providing link means for connecting two components comprising a pair of attachment members spaced relative to one another along the longitudinal axis of the link means and a reinforcement structure connecting the attachment members for the transmission of both tension and compression loads therebetween, the reinforcement structure comprising an endless band of reinforcement material extending between and wrapped around the attachment members to provide two opposed side portions disposed on opposite sides of the longitudinal axis of the link means and wherein each attachment member is fastened to said endless band by respective fastening means comprising reinforcement material wrapped around each attachment member and the adjacent portion of said band.

In the link means according to the present invention the attachment members are positively secured to the endless band forming the reinforcement structure thereby enabling the side portions of the endless band to transmit both tension and compression loads applied to either attachment member. By using the same reinforcement structure to transmit both tension and compression loads manufacture of the link means is simplified while the amount of reinforcement material required to provide side portions capable of accommodating both tension and compression loads is less than the amount of reinforcement material required to provide independent reinforcement structures for the tension and compression loads so that both the cost of providing the link means and the overall weight of the link means is reduced.

Preferably the reinforcement structure is embedded in a solidifiable matrix material which may be applied subsequent to forming the band but more preferably is applied to the reinforcement material prior to forming the band.

The reinforcement structure may be preformed by winding one or more layers of the reinforcement material on a suitable former, solidifying the matrix material and subsequently fastening the attachment members to the bands so formed. Alternatively the reinforcement structure may be formed by winding the reinforcment material directly around the attachment members and solidifying the matrix material either before or after application of the fastening means to secure the attachment members to the band.

The reinforcement material of the reinforcement structure may comprise a single continuous element e.g. filament, strand, cord, cable or the like. Alternatively the reinforcement material may comprise a plurality of elongate elements e.g. filament, strand, cord, cable or the like arranged side-by-side to form a strip in which individual elements extend parallel to one another. The width of the strip may be equal to the width of the finished reinforcement structure or a plurality of strips laid side-by-side to produce the required width may be used. Separate strips may be formed from the same or different reinforcement material depending on the required load characteristics of the reinforcement structure.

Suitable reinforcement materials include natural or synthetic fibres, e.g. cotton, glass, carbon, boron, polyamide, polyester, polyvinyl, alcohol, and aromatic polyamides or metallic materials e.g. steel wire while the solidifiable matrix material may comprise a thermosetting resin e.g. epoxy polyester and vinyl ester where a substantially rigid reinforcement structure is required or a vulcanisable elastomer e.g. natural or synthetic rubbers where a reinforcement structure having a degree of flexibility is required.

The reinforcment material of the fastening means may be the same as or different to that of the reinforcement structure and may be in the form of a single continuous element or a strip as abovedescribed. Preferably the fastening means is embedded in a solidifiable matrix material which may be applied to the fastening means subsequent to the formation thereof but more preferably is applied to the reinforcement material prior to forming the fastening means. The matrix material of the fastening means may be the same or different to that of the reinforcement structure.

Preferably the fastening means is formed by winding the reinforcement material transversely backwards and forwards over the end of the band and the adjacent attachment member e.g. in a figure of eight pattern whereby several layers of reinforcement are formed which positively secure each attachment member to the band.

Preferably the attachment members each comprise a bush comprising inner and outer tubular metal parts and an intermediate layer of elastomeric material. Preferably each bush is cylindrical and the longitudinal axis thereof extends normal to the longitudinal axis of the link means. Preferably the inner metal part has a through bore to receive means for securing the bush to one of the two components to be connected. Preferably each bush has an axial length greater than the transverse width of the reinforcement structure. The reinforcement structure passing around the attachment member may be located in a channel formed in the outer surface of the attachment members.

Side portions of the reinforcement structure may be reinforced along all or part of the axial length thereof by hoop means comprising reinforcement material wrapped around the side portions in a direction transverse to the longitudinal axis of the link means to prevent outward bulging of the side portions under compression loading. The reinforcement material of the hoop means may be the same as or different to that of the reinforcement structure and may be in the form of a single continuous element or a strip as above described. Preferably the hoop means is embedded in a solidifiable matrix material which may be applied to the hoop means subsequent to the formation thereof but more preferably is applied to the reinforcement material prior to forming the hoop means. The matrix material of the hoop means may be the same as or different to that of the reinforcement structure.

The invention will now be described in more detail, by way of example only, with reference to the accompanying drawing wherein.

Figure 2:
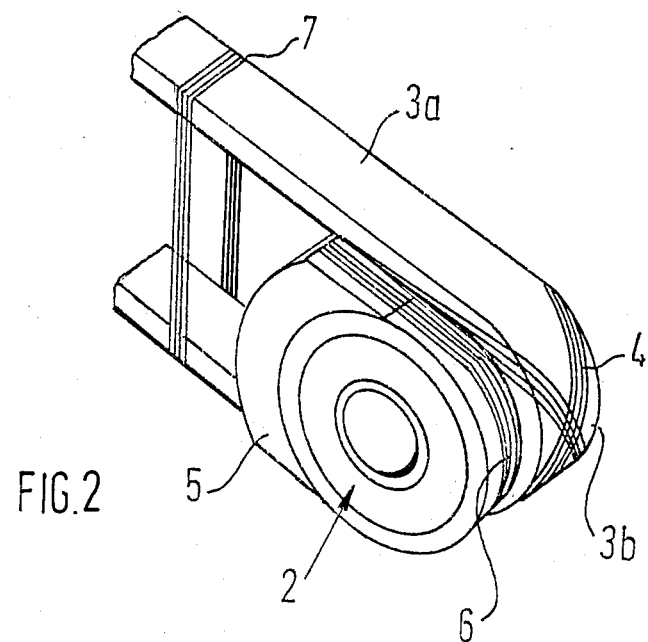
FIG. 2 is a perspective view, to an enlarged scale, of one end of the link means shown in FIG. 1 showing the method of fastening the attachment members to the reinforcement structure.
Figure 1:
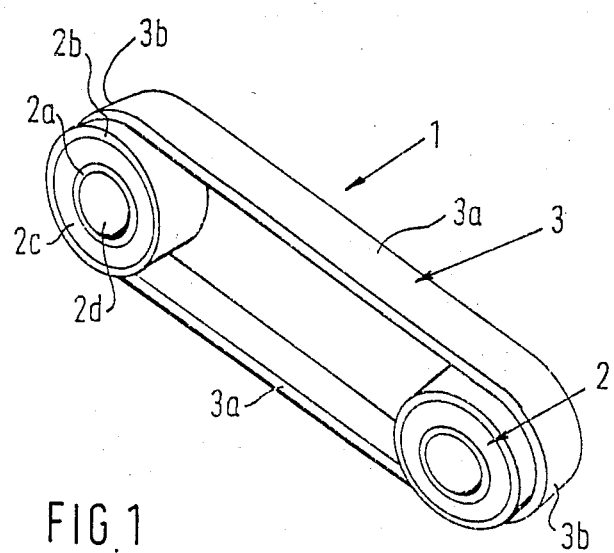
FIG. 1 is a perspective view of a partly assembled link means according to the present invention.
Figure 3:
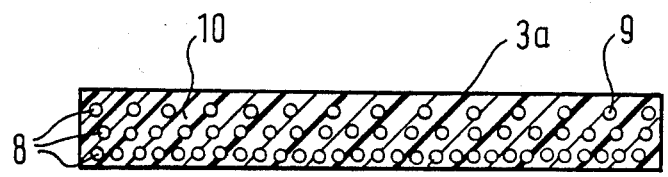
FIG. 3 is a transverse cross sectional view of a side portion 3a of the endless band of FIG. 1.

The link means 1 shown in the accompanying drawing includes a pair of axially spaced cylindrical bushes 2 each comprising inner and outer metal tubes 2a and 2b respectively and an intermediate layer of rubber 2c. Each inner metal tube 2a has a through bore 2d extending normal to the longitudinal axis of the link means to receive a bolt for securing each bush to a respective one of two components to be connected by the link means.

The bushes 2 are interconnected by a reinforcement structure comprising an endless band 3 consisting of several layers 8 of glass fibre filaments 9 embedded in epoxy resin 10 to provide a substantially rigid structure having a pair of side portions 3a each of which extends generally parallel to the longitudinal axis of the link means and a pair of end portions 3b each of which extends around the outside of the respective one of the bushes 2. Band 3 is preformed by winding a continuous length of glass fibre filaments coated with epoxy resin on an oval shaped mandrel, solidifying the epoxy resin and removing the mandrel prior to fastening the bushes 2. Each side portion 3a is of a width and thickness sufficient to withstand the tension and compression loads to which the link means may be subjected in use.

Referring to FIG. 2 each bush 2 is secured to the associated end portion 3b of the band by fastening means 4 consisting of several layers of glass fibre filaments embedded in epoxy resin and formed by winding a continuous length of glass fibre filaments coated with epoxy resin around a saddle member 5 secured to the outer surface of the bush 2 and the end portion 3b of the band in a figure of eight pattern.

Band 3 has a transverse width less than the axial length of the bushes 2 and edge reinforcement 6 are provided around the projecting ends of the bushes 2 to build up the end profile of the link means to prevent undue stressing of the fibres forming the fastening means 4 where the windings thereof pass over the edges of the ends of the link means. Each edge reinforcement 6 consists of several layers of glass fibre filaments embedded in epoxy resin and formed by winding a continuous length of glass fibre filaments coated with epoxy resin circumferentially around the projecting ends of the bushes 2.

In addition a plurality of hoop reinforcements 7 (one only shown) are provided around the side portions 3a of the band to prevent outwards buckling of the side portions 3a under compression loads. The hoop reinforcements 7 are uniformly spaced along the longitudinal axis of the link means and consist of several layers of glass fibre filaments embedded in epoxy resin. Each hoop reinforcement 7 is formed by winding a continuous length of glass fibre filaments coated with epoxy resin around the outside of the side portions 3a.

The link means 1 abovedescribed in which the side portions 3a of the band are formed of reinforcement material extending parallel to the longitudinal axis has a high axial stiffness for the transmission of compression and tension loads applied to either bush 2 but has a relatively soft torsional stiffness allowing the link means to rotate about its longitudinal axis. Link means having such properties have a number of applications, for example in a vehicle suspension in which the link means controls the suspension geometry taking forces due to acceleration, braking, cornering and road surfaces imperfections.

It will be apparent from the foregoing that the present invention provides link means in which a single reinforcement structure provides the means for transmission of both tension and compression loads resulting in link means which is not only easier to manufacture but which for a given load requirement is of lower weight and hence reduced cost compared with known link means using independent reinforcement structures for the transmission of each load.

Having now described my invention, what I claim is:

1. Link means for connecting two components comprising a pair of attachment members spaced relative to one another along the longitudinal axis of the link means and a reinforcement structure connecting said attachment members for the transmission of both tension and compression loads therebetween, said reinforcement structure comprising an endless band of reinforcement material extending between said attachment members, said band having two side portions disposed to extend generally in the direction of the longitudinal axis of the link means and two end portions each disposed around a respective attachment member each said attachment member having in a direction perpendicular to said longitudinal axis of the link a length which is greater than the transverse width of said reinforcement structure whereby said attachment member extends beyond either side of a respective end of said reinforcement structure, and respective fastening means comprising reinforcement material extending to either side of said reinforcement structure and wrapped around each attachment member and the adjacent end portion of said band at each side of the reinforcement structure for securing said attachment members to said bank whereby the link means is able to withstand applied tension or compression loads.

2. Link means according to claim 1 wherein said reinforcement structure is embedded in a solidifiable matrix material.

3. Link means according to claim 2 wherein said matrix material is applied subsequent to forming said reinforcement structure.

4. Link means according to claim 2 wherein said matrix material is applied to said reinforcement material of said reinforcement structure prior to forming said reinforcement structure.

5. Link means according to claim 1 wherein said reinforcement material of said reinforcement structure comprises a single continuous element.

6. Link means according to claim 5 wherein said element is selected from the group consisting of a filament, strand, cord and cable.

7. Link means according to claim 1 wherein said reinforcement material of said reinforcement structure comprises a strip formed by a plurality of parallel elongate elements arranged side-by-side.

8. Link means according to claim 7 wherein each element is selected from the group consisting of a filament, strand, cord and cable.

9. Link means according to claim 1 wherein said fastening means is embedded in a solidifiable matrix material.

10. Link means according to claim 9 wherein said matrix material is applied subsequent to forming said fastening means.

11. Link means according to claim 9 wherein said matrix material is applied to said reinforcement material of said fastening means prior to forming said fastening means.

12. Link means according to claim 1 wherein said reinforcement material of said fastening means comprises a single continuous element.

13. Link means according to claim 12 wherein said element is selected from the group consisting of a filament, strand, cord and cable.

14. Link means according to claim 1 wherein said reinforcement material of said fastening means comprises a strip formed by a plurality of parallel elongate elements arranged side-by-side.

15. Link means according to claim 14 wherein each element is selected from the group consisting of a filament, strand, cord and cable.

16. Link means according to claim 1 wherein said fastening means is formed by winding said reinforcement material transversely backwards and forwards over said attachment members and said adjacent end portions of said band.

17. Link means according to claim 1 wherein each attachment member comprises a bush consisting of rigid inner and outer tubular parts and an intermediate layer of elastomeric material.

18. Link means according to claim 17 wherein each bush has its longitudinal axis normal to said longitudinal axis of said link means.

19. Link means according to claim 17 wherein each bush has a circumferential channel in which said adjacent end portion of said reinforcement structure is received.

20. Link means according to claim 17 wherein a saddle member is secured to an outer surface of the bush to extend beyond either side of a respective end of said reinforcement structure and wherein the fastening means is arranged to extend around the saddle member and adjacent end portion of said band at each side of the reinforcement structure.

21. Link means according to claim 1 wherein said fastening means is reinforced at each edge by a respective edge reinforcement.

22. Link means according to claim 21 wherein each edge reinforcement is embedded in a solidifiable matrix material.

23. Link means according to claim 21 wherein each edge reinforcement comprises a single continuous element selected from the group consisting of a filament, strand, cord and cable.

24. Link means according to claim 21 wherein each edge reinforcement comprises a strip formed by a plurality of parallel elongate elements arranged side-by-side, each element being selected from the group consisting of a filament, strand, cord and cable.

25. Link means according to claim 1 wherein said reinforcement structure is reinforced along at least part of the axial length thereof by hoop means.

26. Link means according to claim 25 wherein said hoop means comprises reinforcement material extending between and wrapped around said side portions of said reinforcement structure.

27. Link means according to claim 25 wherein said hoop means is embedded in a solidifiable matrix material.

28. Link means according to claim 25 wherein said hoop means comprises a single continuous element selected from the group consisting of a filament, strand, cord, and cable.

29. Link means according to claim 25 wherein said hoop means comprises a strip formed by a plurality of parallel elongate elements arranged side-by-side, each element being selected from the group consisting of a filament, strand, cord and cable.

30. Link means for connecting two components comprising a pair of attachment members spaced relative to one another along the longitudinal axis of the link means and a reinforcement structure connecting said attachment members for the transmission of both tension and compression loads therebetween, said reinforcement structure comprising an endless band of reinforcement material extending between said attachment members, said band having two side portions disposed to extend generally in the direction of the longitudinal axis of the link means and two end portions each disposed around a respective attachment member each said attachment member having in a direction perpendicular to said longitudinal axis of the link a length which is greater than the transverse width of said reinforcement structure whereby said attachment member extends beyond either side of a respective end of said reinforcement structure, and respective fastening means comprising reinforcement material extending to either side of said reinforcement structure and comprising reinforcement material wound transversely backwards and forwards over a respective attachment member and adjacent end portion of the band so as to extend to either side of said reinforcement structure and be wrapped around each attachment member and the adjacent end portion of said bank at each side of the reinforcement structure for securing said attachment members to said band whereby the link means is able to withstand applied tension or compression loads.

* * * * *